(12) United States Patent
Farrell et al.

(10) Patent No.: US 10,237,270 B2
(45) Date of Patent: Mar. 19, 2019

(54) DISTRIBUTED STORAGE OF AUTHENTICATION DATA

(71) Applicant: INTERNATIONAL BUSINESS MACHINES CORPORATION, Armonk, NY (US)

(72) Inventors: Leo M. M. Farrell, Main Beach (AU); Benjamin M. E. Martin, Southport (AU); David P. Moore, Robina (AU); Jasmine A. Smith, Southport (AU); Shane B. Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/279,492

(22) Filed: Sep. 29, 2016

(65) Prior Publication Data
US 2018/0091505 A1 Mar. 29, 2018

(51) Int. Cl.
*H04L 9/32* (2006.01)
*H04L 29/06* (2006.01)

(52) U.S. Cl.
CPC ............ *H04L 63/0861* (2013.01); *H04L 9/32* (2013.01); *H04L 9/3231* (2013.01); *H04L 9/3239* (2013.01); *H04L 63/0428* (2013.01); *H04L 63/0442* (2013.01); *H04L 63/062* (2013.01)

(58) Field of Classification Search
CPC .... H04L 63/0861; H04L 9/32; H04L 63/0442
USPC ........................................................ 713/170
See application file for complete search history.

(56) References Cited

U.S. PATENT DOCUMENTS

| | | | |
|---|---|---|---|
| 7,249,177 | B1 | 7/2007 | Miller |
| 8,566,904 | B2 | 10/2013 | Pizano et al. |
| 9,015,483 | B2 | 4/2015 | Baskaran |
| 9,202,083 | B2 | 12/2015 | Morris et al. |
| 9,361,440 | B2 | 6/2016 | Kramer |
| 2003/0115475 | A1* | 6/2003 | Russo ............... G06K 9/00026 713/186 |
| 2004/0034783 | A1 | 2/2004 | Fedronic et al. |
| 2005/0033963 | A1 | 2/2005 | Ronchi et al. |

(Continued)

FOREIGN PATENT DOCUMENTS

WO 2016105728 A1 6/2016

OTHER PUBLICATIONS

Bioid, "Face Recognition & Voice authentication—Multimodal biometrics, Forget passwords. Be recognized," https://www.bioid.com/, Printed on Aug. 28, 2016, pp. 1-3.

(Continued)

*Primary Examiner* — Teshome Hailu
(74) *Attorney, Agent, or Firm* — Dmitry Paskalov

(57) ABSTRACT

A biometric server receives, a transmission of a biometric sample and an encrypted enrollment template of the user from a client device, wherein the encrypted enrollment template comprises an encrypted mathematical representation of historical biometric data of the user, and wherein the biometric sample comprises a current snapshot of the biometric data. The biometric server decrypts the encrypted enrollment template to an enrollment template using an enrollment template key. The biometric server converts the biometric sample to a biometric template. The biometric server, based on determining that the biometric template is similar to the enrollment template associated with the user, sends an access token to the client device.

20 Claims, 6 Drawing Sheets

(56) References Cited

U.S. PATENT DOCUMENTS

| | | | |
|---|---|---|---|
| 2007/0220274 A1* | 9/2007 | Jensen | G06F 21/32 |
| | | | 713/186 |
| 2007/0283164 A1* | 12/2007 | Nishizawa | H04L 63/0861 |
| | | | 713/186 |
| 2009/0031125 A1 | 1/2009 | Bjom | |
| 2013/0074194 A1* | 3/2013 | White | H04L 51/24 |
| | | | 726/28 |
| 2013/0074195 A1* | 3/2013 | Johnston | H04L 51/34 |
| | | | 726/28 |
| 2014/0013405 A1* | 1/2014 | White | H04L 63/0861 |
| | | | 726/5 |
| 2015/0221151 A1 | 8/2015 | Bacco et al. | |
| 2015/0371052 A1 | 12/2015 | Lepeshenkov et al. | |

OTHER PUBLICATIONS

Mell et al., "The NIST Definition of Cloud Computing," National Institute of Standards and Technology, U.S. Department of Commerce, Special Publication 800-145, Sep. 2011, pp. 107.

IBM: List of IBM Patents or Patent Applications Treated as Related (Appendix P), Mar. 20, 2018, pp. 1-2.

Farrell et al., U.S. Appl. No. 15/279,492, filed Sep. 29, 2016, titled "Distributed Storage of Authentication Data", pp. 1-31.

* cited by examiner

DISTRIBUTED STORAGE OF AUTHENTICATION DATA

BACKGROUND

The present invention relates generally to a field of authentication, verification, and access control systems and more particular to a distributed storage of authentication data.

Traditional username and password verification methods are substituted by market demand for low friction authentication. Low friction authentication is a method of authentication and identification of a user or a device that does not require memorizing passwords by a user and is typically performed by biometric authentication, such as a fingerprint scanner.

SUMMARY

Embodiments of the present invention provide a system, method, and program product for distributed storage of authentication data. A biometric server receives, a transmission of a biometric sample and an encrypted enrollment template of the user from a client device, wherein the encrypted enrollment template comprises an encrypted mathematical representation of historical biometric data of the user, and wherein the biometric sample comprises a current snapshot of the biometric data. The biometric server decrypts the encrypted enrollment template to an enrollment template using an enrollment template key. The biometric server converts the biometric sample to a biometric template. The biometric server, based on determining that the biometric template is similar to the enrollment template associated with the user, sends an access token to the client device.

DETAILED DESCRIPTION

Figure 1:
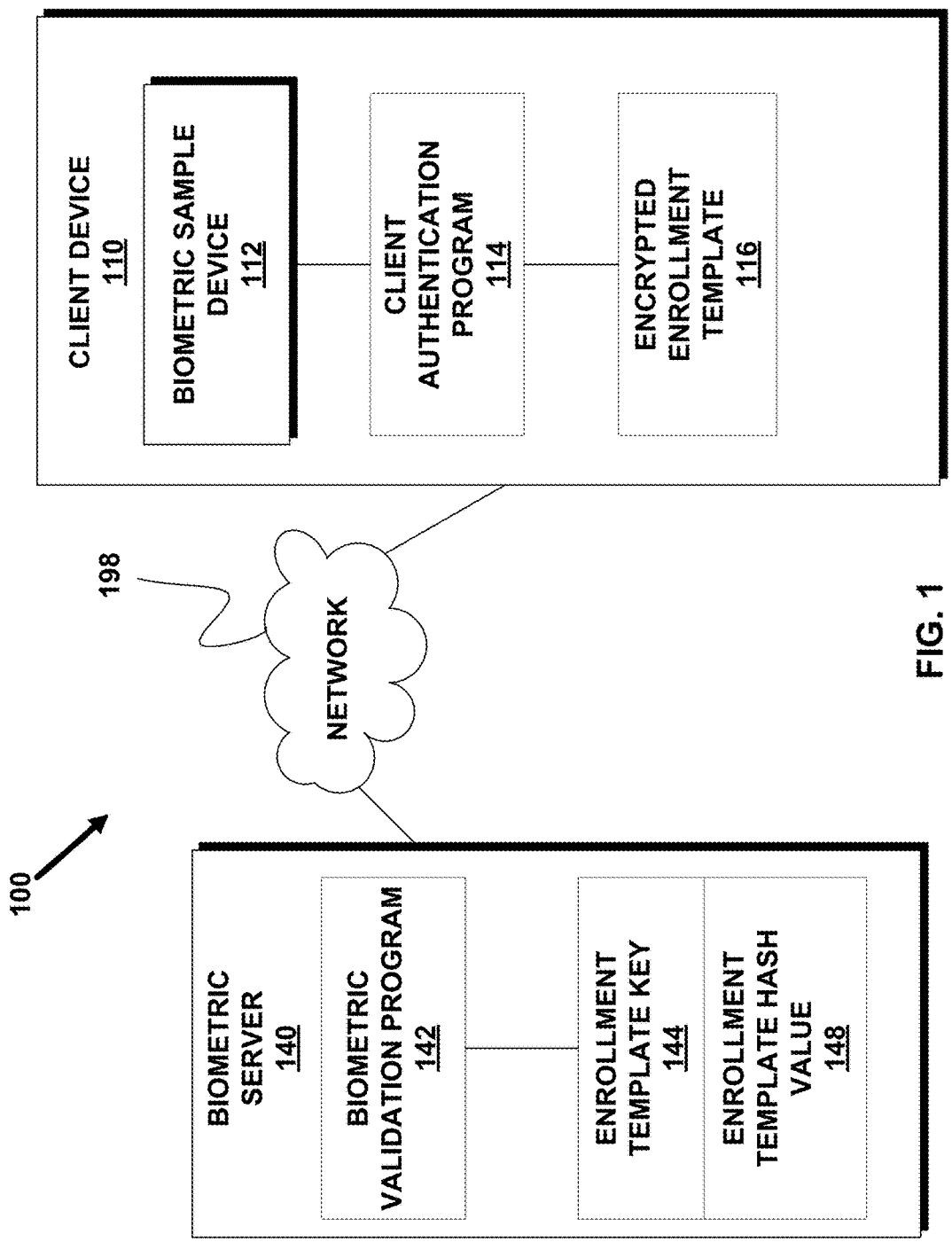
FIG. 1 illustrates a Distributed Storage of Authentication Data system, in accordance with an embodiment of the invention.

Biometric data is stored and verified in accordance with two approaches. The first approach is a local authentication. Local authentication stores all the biometric information on a local device and the authentication is performed locally. An example of local authentication is a smartphone with a fingerprint scanner that grants access when a user authenticates by scanning a fingerprint.

The second approach of local authentication is a remote server authentication. The remote server authentication approach uses an authentication server that stores all the biometric data, such as a biometric template, as a mathematical representation of a biometric data sample initially collected during user enrollment and later used to compare samples to authenticate the user.

To increase security and to protect a biometric template, the biometric template is typically encrypted using asymmetric cryptography before the biometric data sample is transferred over a public network. Asymmetric cryptography is any cryptographic method that uses pairs of keys. The first key in a pair is a public key that may be widely disseminated and used to encrypt a data. The public key is paired with a private key which is known only to the owner who generated the key pair. The two main functions achieved by pair public and private keys are to authenticate that a message originated with a holder of the paired private key and encrypting a message with a public key to ensure that only the holder of the paired private key may decrypt the message.

Modern authentication and access control systems are adopting two-factor authentication (2FA) methods to identify a user combined with an asymmetric cryptography to protect data from unauthorized usage. A 2FA is a method to authenticate the user by utilizing a combination of two different components of the three following categories: (i) user knowledge (such as password), (ii) user possession (such as smartphone or computing device associated with the user), (iii) user inherence (such as biometric property of the user).

Typically, user identification and authentication are based on 2FA authentication models, including biometric data, since devices increasingly incorporate biometric data scanners that may identify and authenticate the user. Biometric authentication may be used in a wide range of restricted access services. However, centralized systems incorporating biometric data for identification and authentication frequently experience user refusal to adopt the centralized 2FA authentication methods (i.e. adoption resistance). One reason for adoption resistance is user privacy concerns as well as unauthorized access to the user biometric data (e.g. third party hacking). Typically, the unauthorized access attempts rise when a large amount of biometric data is stored in one place, such as on a single server, since successfully gaining access to such a large amount of data may result in the unauthorized usage and dissemination of a vast amount of stored biometric data and, therefore, cause a serious reputational harm to a service provider. An economic concern also exists since storing biometric data requires large data storage capabilities and more aggressive scaling when more users are registering for the offered services.

An example embodiment provides a system, method, and program product that may allow for secure storage of an encrypted template of biometric data on a client device while user authentication is performed by a biometric server that stores only a key to decrypt the biometric data and a hashing value of the template for template validation. Therefore, biometric data may not be stored on the biometric server, and unauthorized access to either the client device or the biometric server may not compromise or grant access to the service that requires biometric authentication and identification. In addition, storage requirements of the biometric server may be reduced since no biometric templates are stored on the biometric server.

FIG. 1 illustrates a Distributed Storage of Authentication Data (DSAD) system 100 that identifies and authenticates a user utilizing biometric data, in accordance with an embodiment of the invention. In an example embodiment, DSAD system 100 comprises a client device 110 and biometric server 140 interconnected via network 198. DSAD system 100 implements an enrollment process to add a new user to the system by adding biometric data associated with the new user as an identification and authentication component, as described in greater detail with regard to FIG. 2. After enrollment, DSAD system 100 may perform an identification and authentication process to grant an access to a client device that provided the corresponding new user biometric data associated with the enrolled new user biometric data as described in greater detail with regard to FIG. 3

In accordance with an embodiment of the invention, network 198 is the Internet, representing a worldwide collection of networks and gateways to support communications between devices connected to the Internet. Accordingly, network 198 may include, for example, wired, wireless or fiber optic connections. In other embodiments, network 198 may be implemented as an intranet, a local area network (LAN), or a wide area network (WAN). In general, network 198 may be any combination of connections and protocols that will support communications between biometric server 140 and client device 110.

According to an example embodiment, client device 110 represents a platform configured to collect a user biometric sample and by communicating with biometric server 140 to enroll, identify, authenticate, and receive access to a service controlled by biometric server 140. For example, client device 110 may be a desktop computer, a notebook, a laptop computer, a tablet computer, a handheld device, a smartphone, a thin client, or any other electronic device or computing system capable of receiving and sending data to and from other computing devices, such as biometric server 140, via network 198. In an example embodiment, client device 110 includes biometric sample device 112 that is configured to collect a sample from biometric sample device 112 and transmit the biometric sample to client authentication program 114. In other embodiments, biometric sample device 112 may be an external device that is connected to client device 110 by wired, wireless, or via network 198.

Biometric sample device 112 may be an electronic device that is capable of receiving physical characteristics of the user, such as a fingerprint, iris image, voice, typing speed, or pattern in key press intervals and transform them into an electrical signal. According to an example embodiment, biometric sample device 112 may be any device capable of capturing biometric data, such as a fingerprint reader, a retina scanner, or a voice recognition device. In other embodiments, a pattern in key press intervals, typing speed variations or key pressure sensitivity may be analyzed, for example, by keystroke dynamics analyzing algorithms, when a user is instructed to type his own name or predefined string of letters. In general, biometric sample device 112 may be a sensor configured to receive and/or monitor physical characteristics of the user for user authentication.

Client authentication program 114 may be a software program operating on client device 110 and configured to request a biometric sample from a user, receive biometric sample data from biometric sample device 112, send the biometric sample to biometric server 140 after converting and encrypting the biometric template in accordance with biometric validation program 142 requirements, and receive a decision with or without an access token. An access token may be security credentials that identify the user and provide a login session to a service, an application, or any other restricted data or software.

According to an example embodiment, encrypted enrollment template 116 may be a mathematical representation of the user biometric data such as historical biometric data collected from the user during an enrollment and encrypted using asymmetrical encryption that may be decrypted only by enrollment template key 144. For example, if the biometric sample device 112 is a fingerprint scanner, then the encrypted enrollment template 116 is an encrypted mathematical representation of the user fingerprint scan that can be decrypted using enrollment template key 144 stored on biometric server 140. Encrypted enrollment template 116 may be stored in the persistent memory of client device 110. After encryption, only Biometric Validation Program 142 may use the enrollment template key 144 associated with the user to decrypt the encrypted enrollment template 116.

According to an example embodiment, biometric server 140 may represent an authentication platform configured to send and receive data from client device 110 over network 198. For example, biometric server 140 may be a web server, file server, desktop computer, or any other electronic device or computing system capable of exchanging content over network 198. Although not shown, optionally, biometric server 140 may comprise a cluster of servers. In an example embodiment, biometric server 140 may be a computing system that is optimized for the support of multiple network requests related to enrollment and authentication of users operating client device 110. In this embodiment, biometric server 140 may execute biometric validation program 142 that enrolls, authenticates, and grants access to a user by sending an access token to client device 110. According to an example embodiment, biometric server 140 may store authentication information associated with every enrolled user, including enrollment template key 144 and enrollment template hash value 148.

According to an example embodiment, enrollment template key 144 may be a part of the asymmetric encryption key chain generated by biometric validation program 142 during enrollment of a new user. Enrollment template key 144 may be used to decrypt the biometric sample transferred from client authentication program 114 to biometric validation program 142.

According to an example embodiment, enrollment template hash value 148 may be a value that is generated by a cryptographic hash function. A cryptographic hash function may allow for verification of the input data maps to a given hash value. According to an example embodiment, during enrollment, the user enrollment biometric sample is converted to an enrollment template. Before encryption of the enrollment template, the enrollment template is converted to an enrollment template hash value 148 by applying the cryptographic hash function to the enrollment template 116. The resulting enrollment template hash value 148 is stored in the persistent memory of biometric server 140. For example, the cryptographic hash function may be a checksum function (i.e. a digit representing the sum of the correct digits in a piece of stored or transmitted digital data) that, for example, divides the template data to bytes and sums the bytes to a final value that is stored as enrollment template hash value 148.

Biometric Validation Program (BVP) 142 may operate on biometric server 140, and represent a software program configured to enroll, authenticate, and grant or reject user access by sending an access token to client device 110 when the access is granted or a decision when the access is denied. The access token or the decision may be accompanied by a message explaining why the access was granted or rejected. For example, BVP 142 may grant access to a social media service after receiving a user biometric sample and encrypted enrollment template 116, decrypting, authenticating and comparing the template and the sample and sending back an access token to client device 110 that allows the user to view the associated social media service or website if the biometrical sample and template are of the same enrolled user. The operations and functions of BVP 142 are described in further details below with regard to FIGS. 2 and 3.

Figure 2:
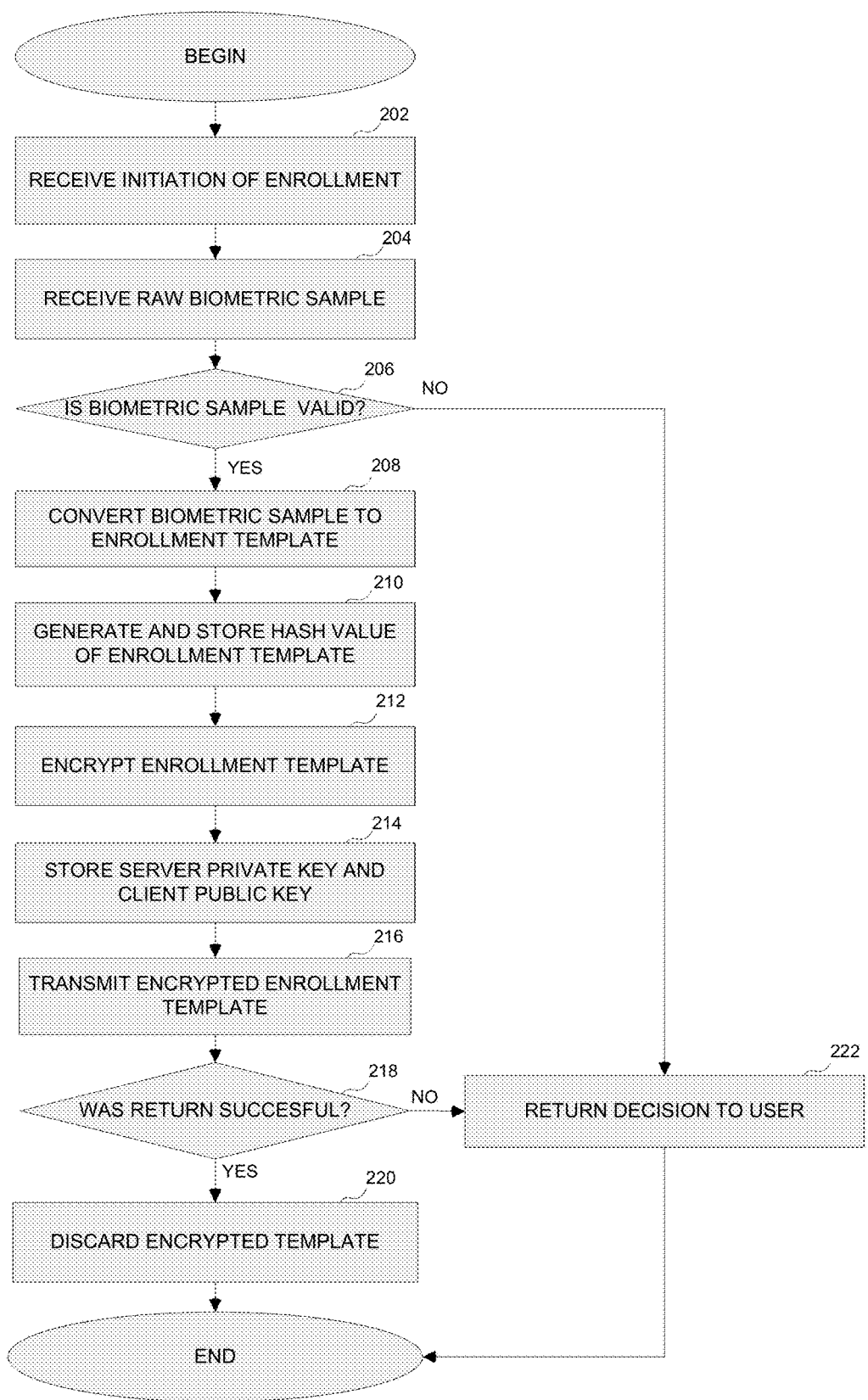
FIG. 2 is a flowchart illustrating operations of the Biometric Validation Program of FIG. 1 during enrollment, in accordance with an embodiment of the invention.

FIG. 2 is a flowchart illustrating the operations of BVP 142 during user enrollment, in accordance with an embodiment of the invention. User enrollment may be a process that is required to collect a biometric sample from a user and convert the biometric sample to an enrollment template that is encrypted to create encrypted enrollment template 116 and used by BVP 142 to authenticate the user during authentication. Referring to step 202, BVP 142 receives initiation of enrollment flow from client device 110. The enrollment flow may be initiated by receiving specific data or a command from client device 110 via network 198. According to an example embodiment, after enrollment initiation, BVP 142 initiates an asymmetric encrypted communication with client authentication program 114. For example, BVP 142 generates a key pair (i.e. a public key and a private key) and sends the generated public key to client authentication program 114 to encrypt all the data with a generated public key while the generated private key will be used by BVP 142 to decrypt the biometric data sent back by client authentication program 114.

After initiation of enrollment, client authentication program 114 collects a biometric sample from biometric sample device 112 and sends the biometric sample with encrypted enrollment template 116 through encrypted communication (i.e. asymmetric cryptography) to BVP 142.

Referring to step 204, BVP 142 receives a raw biometric sample for user enrollment, collected by biometric sample device 112 and transmitted through encrypted communication. For example, client authentication program 114 configured to operate a smart phone with biometric sample device 112, such as a fingerprint scanner collects a raw biometric sample from a user, encrypts the raw biometric sample with a server public key and transmits it to BVP 142.

Referring to decision 206, BVP 142 determines whether the biometric sample is valid, based on quality of the raw biometric sample. According to an example embodiment, the raw biometric sample may be transmitted as an image. Therefore, BVP 142 may determine whether the raw biometric sample is valid if the raw biometric sample has correctly represented biometric data. For example, the BVP 142 may determine a resolution, a brightness, a focus, and a saturation are above a preconfigured threshold value, and whether the raw biometric sample may be converted to an enrollment template. According to an example embodiment, the enrollment template may represent a digital reference of distinct characteristics of the raw biometric sample to be compared with the biometric sample of the user collected during authentication. If the raw biometric sample is valid (decision 206, "YES" branch) BVP 142 proceeds to step 208. If the biometric sample is not valid (decision 208, "NO" branch) BVP 142 proceeds to step 222.

Referring to step 208, BVP 142 converts the raw biometric sample to an enrollment template. According to an example embodiment, BVP 142 applies a corresponding biometrics technique to convert the biometric sample to an enrollment template and discards the raw biometric sample. For example, an enrollment template may be data extracted from a predetermined part of a monochromatic image, created from the raw biometric sample of the finger and saved as the enrollment template in order to compare against subsequent samples to aid in a user authentication.

Referring to step 210, BVP 142 generates and stores an enrollment template hash value 148. According to an example embodiment, BVP 142 may convert the enrollment template to an enrollment template hash value 148 by applying a cryptographic hash function or hashing by non-linear lookup method. For example, converting the enrollment template using an SHA-1 hashing technique that converts the enrollment template to a hash value rendered as a hexadecimal number of 40 digits. Enrollment template hash value 148 may be used during authentication to validate that the enrollment template was not falsified or exchanged to gain access to the service provided by BVP 140. According to an example embodiment, enrollment template hash value 148 may be stored in the persistent memory of biometric server 140 and associated with the user. For example, enrollment template hash value 148, when stored, may be associated with a user. In another embodiment, the hash value may be associated with a client device 110, by associating enrollment template hash value 149 with a unique identifier such as MAC address, IMEI number, TCP/IP number, or other user or device unique identification parameter.

Referring to step 212, BVP 142 encrypts the enrollment template and converts the enrollment template to encrypted enrollment template 116. According to an example embodiment, BVP 142 may encrypt the enrollment template with the server generated public key received with the raw biometric sample (step 204), while enrollment template key 144 may be used to decrypt the encrypted enrollment template 116. In another embodiment, BVP 142 may generate a new server key pair and encrypt the enrollment template with a new server public key and store the new server public key as an enrollment template key 142. After generating encrypted enrollment template 116 BVP 142 discards the enrollment template.

Referring to step 216, BVP 142 transmits encrypted enrollment template 148 to client authentication program 114. Encrypted enrollment template 148 may be stored by the client authentication program 114 in the persistent memory of client device 110 and used for authentication procedures described in FIG. 3 below.

Referring to decision 218, BVP 142 determines whether the encrypted enrollment template 148 was successfully returned to client authentication program 114. According to an example embodiment, if encrypted enrollment template 148 was received by client authentication program 114, client authentication program 114 sends an acknowledgment of the receipt back to BVP 142. If the acknowledgment of the receipt is received (decision 226, "YES" branch), BVP 142 proceeds to step 220. If the encrypted enrollment template 148 was not successively sent to client authentication program 114 (decision 226, "NO" branch), BVP 142 proceeds to step 222.

Referring to step 220, BVP 142 discards encrypted enrollment template 148 after the copy of the encrypted enrollment template 148 is received by client authentication program 114. According to an example embodiment, BVP 142 may store only an enrollment template hash value 148 and an enrollment template key 144. All other data related to user biometrics may be stored on client device 110 and deleted from biometric server 140.

Referring to step 222, BVP 142 returns decision to user. According to an example embodiment, BVP 142 transmits a message that the enrollment process failed to client authentication program 114 that displays the message to a user. In other embodiment, BVP 142 may transmit a specific message, for example, that the biometric sample is invalid if the raw biometric sample was invalid (decision 206, "NO" branch) or that there was a problem with a connection if BVP 142 was not able to transmit the encrypted enrollment template 116 to client authentication program 114 (decision 218, "NO" branch).

Figure 3:
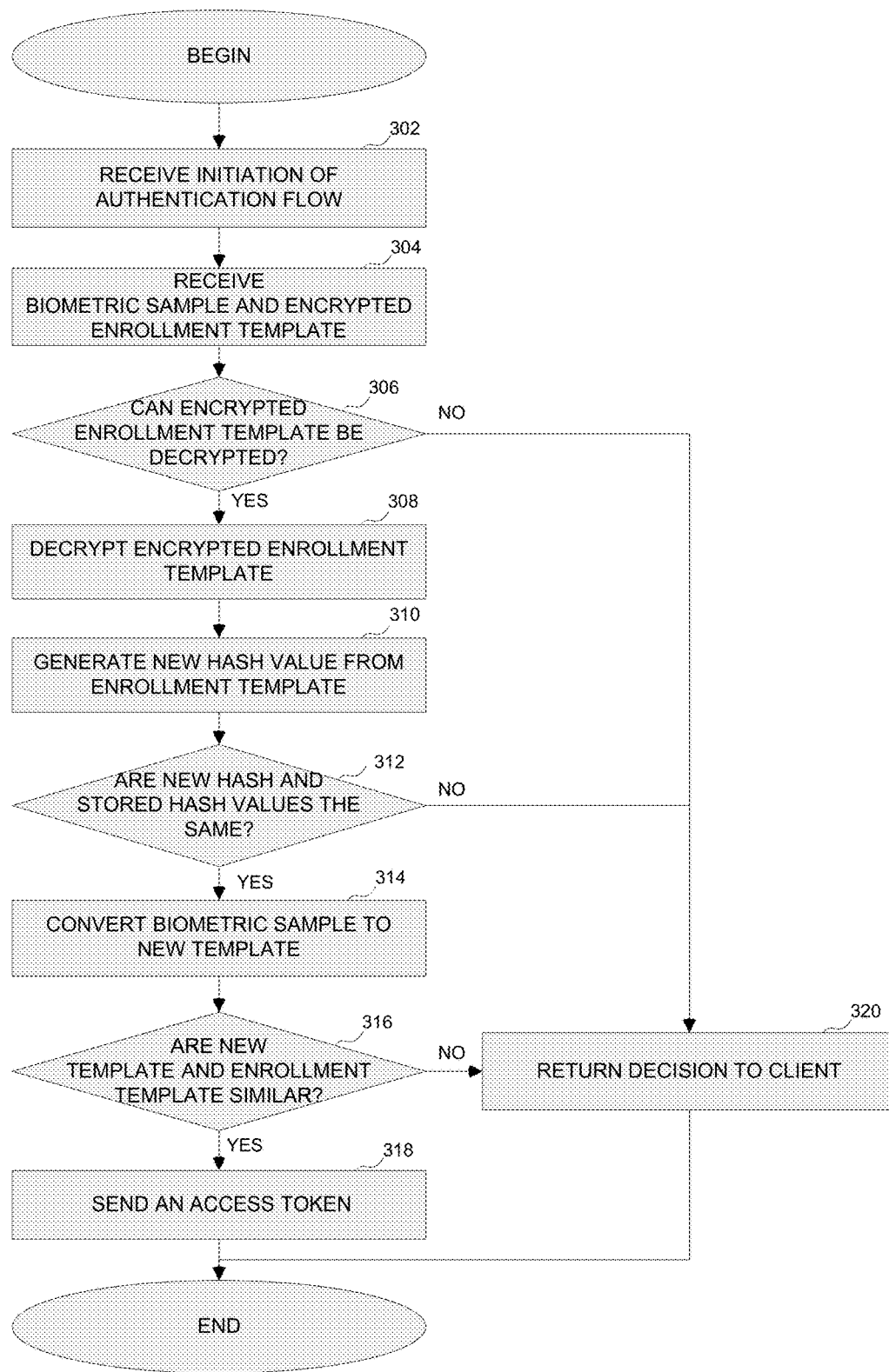
FIG. 3 is a flowchart illustrating operations of the Biometric Validation Program of FIG. 1 during authentication, in accordance with an embodiment of the invention.

FIG. 3 is a flowchart illustrating the operations of BVP 142 during user authentication, in accordance with an embodiment of the invention. Referring to step 302, BVP 142 receives initiation of an authentication flow from client device 110. The authentication flow may be initiated by receiving a specific data or command from client device 110 via network 198.

Referring to step 304, BVP 142 receives a biometric sample and encrypted enrollment template 116 transmitted through encrypted communication. According to an example embodiment, client authentication program 114 collects a biometric sample, a current snapshot of the biometric data, with biometric device 112, encrypts the biometric sample together with encrypted enrollment sample 114 and transmits the biometric sample and encrypted enrollment sample 114 in a single payload to BVP 142 via network 198. For example, client authentication program 114 may collect a biometric sample with biometric device 112 and compile an encrypted payload using asymmetric encryption including (i) the biometric sample, (ii) encoded user template 116, (iii) a nonce, (iv) an answer to the server challenge, and sends the payload to BVP 142 via network 198. The server challenge may be a request for an authentication used in computer security. Additionally, a nonce may be an arbitrary number used to determine communication authenticity and to insure that a communication will not be reused in replay attack.

Referring to decision 306, BVP 142 determines whether encrypted enrollment template 116 may be decrypted with a corresponding enrollment template key 144 associated with the user or client device 110. For example, after decryption, specific data that should be located at the specific location of an enrollment template, such as the first data, may be required to be equal to the size of the enrollment template. In other embodiment, enrollment template may be required to be of a specific size. If encrypted enrollment template 116 may be decrypted with enrollment template key 144 (decision 306, "YES" branch), BVP 142 proceeds to step 308. If the encrypted enrollment template 116 may not be decrypted with enrollment template key 144 (decision 306, "NO" branch), BVP 142 proceeds to step 320.

Referring to step 308, BVP 142 decrypts the encrypted enrollment template 116 with enrollment template key 144. For example, encrypted enrollment template 116 may be encrypted using asymmetric cryptography where enrollment template key 144 is a private key used to decrypt encrypted enrollment template 116. According to an example embodiment, BVP 142 may have stored the enrollment template key 144 associated with the encrypted enrollment template 116 during enrollment process (FIG. 2).

Referring to step 310, BVP 142 generates a new hash value from the enrollment template. As previously described, the cryptographic hash function that converts data to a hash value may be a checksum function that, for example, divides the template data to bytes and sums the bytes up to a final value. According to an example embodiment, BVP 142 may use the same method of hashing as during the enrollment process in order to receive the same hash values if the enrollment templates are the same. According to an example embodiment, the new hash value represents the current hash value generated from a current snapshot of the biometric data.

Referring to decision 312, BVP 142 determines whether the new hash value and the corresponding enrollment template hash value 148 are the same. According to an example embodiment, BVP 142 may read the stored enrollment template hash value 148 from persistent memory of biometric server 140. If the new hash value is the same as the enrollment template hash value 148 (decision 312, "YES" branch), BVP 142 proceeds to decision step 314. If the new hash value is different from the stored enrollment template hash value 148 (decision 312, "NO" branch), BVP 142 proceeds to step 320.

Referring to step 314, BVP 142 converts the biometric sample received from client authentication program 114 to a new template. According to an example embodiment, BVP 142 may use the same method of generating a new template as during the enrollment process. As previously mentioned, for example, a new template may be determined from a predetermined part of the biometric sample captured in a monochromatic image of the fingerprint and saved as the enrollment template in order to compare against the previously submitted enrollment template.

Referring to decision 316, BVP 142 determines whether the new template and the enrollment template are similar based on predetermined tolerance thresholds. According to an example embodiment, BVP 142 compares the templates and assesses their similarity according to known methods, such as a fingerprint template matching method. If the templates are within predetermined tolerances of similarity, the templates are considered similar (decision 316, "YES" branch), BVP 142 proceeds to decision 318. If the templates are not within predetermined tolerances of differences (decision 316, "NO" branch), BVP 142 proceeds to step 320.

Referring to step 318, BVP 142 sends an access token to client authentication program 114. According to an example embodiment, BVP 142 may send an access token to client authentication program 114, corresponding to the service the user was authenticating for and may discard all the biometric and encryption data received from client authentication program 114 to avoid access to any user biometric data if server 140 is compromised.

Referring to step 320, BVP 142 returns a decision to the client device 110. According to an example embodiment, BVP 142 transmits a message to client authentication program 114 stating that authentication failed. In another embodiment, BVP 142 transmits a message corresponding to a reason for failure, such as encryption is incorrect (decision 306, "NO" branch) or the biometric data is incorrect (decision 312, "NO" branch).

Figure 4:
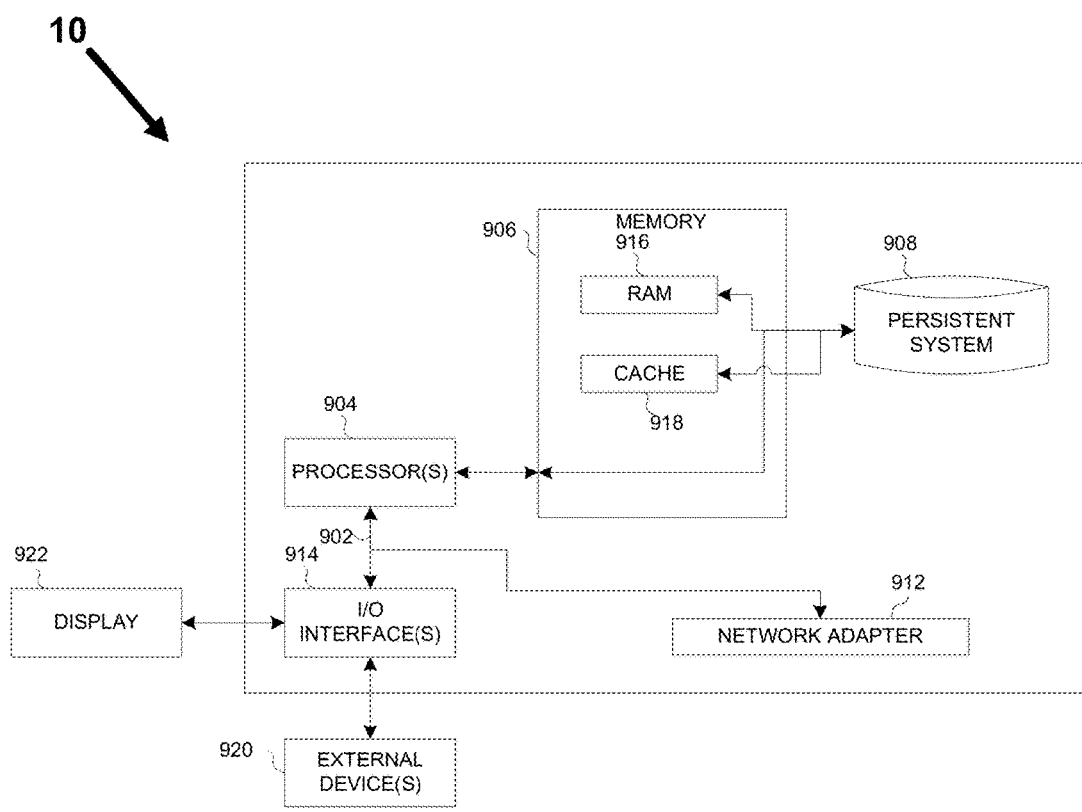
FIG. 4 is a block diagram depicting the hardware components of the Distributed Storage of Authentication Data system of FIG. 1, in accordance with an embodiment of the invention.

FIG. 4 depicts a block diagram of components of client device 110 and biometric server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A client device 110 and a biometric server 140 include communications fabric 902, which provides communications between computer processor(s) 904, memory 906, persistent storage 908, communications unit 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Memory 906 and persistent storage 908 are computer-readable storage media. In this embodiment, memory 906 includes random access memory (RAM) 916 and cache memory 918. In general, memory 906 may include any suitable volatile or non-volatile computer-readable storage media.

The PFCR 114 program is stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 may provide communications using one or both of physical and wireless communications links. The PFCR program 114 may be downloaded to persistent storage 908 through communications unit 912.

I/O interface(s) 914 allows for input and output of data with other devices that may be connected to client device 110 and biometric server 140. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., the PFCR program 114 may be stored on such portable computer-readable storage media and may be loaded onto persistent storage 908 via I/O interface(s) 914. I/O interface(s) 914 may also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
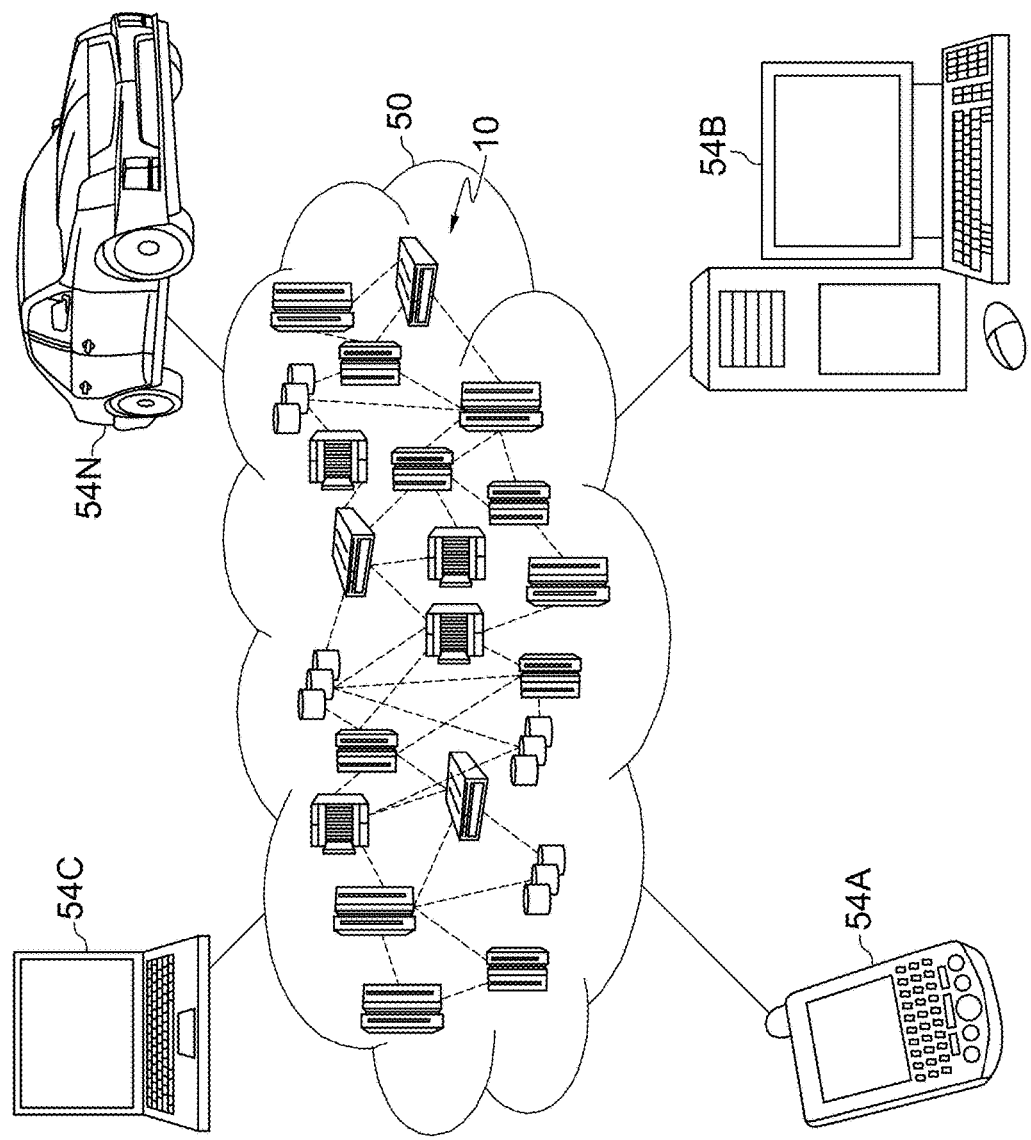
FIG. 5 depicts a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 may communicate with any type of computerized device over any type of network and/or network addressable connection (e.g., using a web browser).

Figure 6:
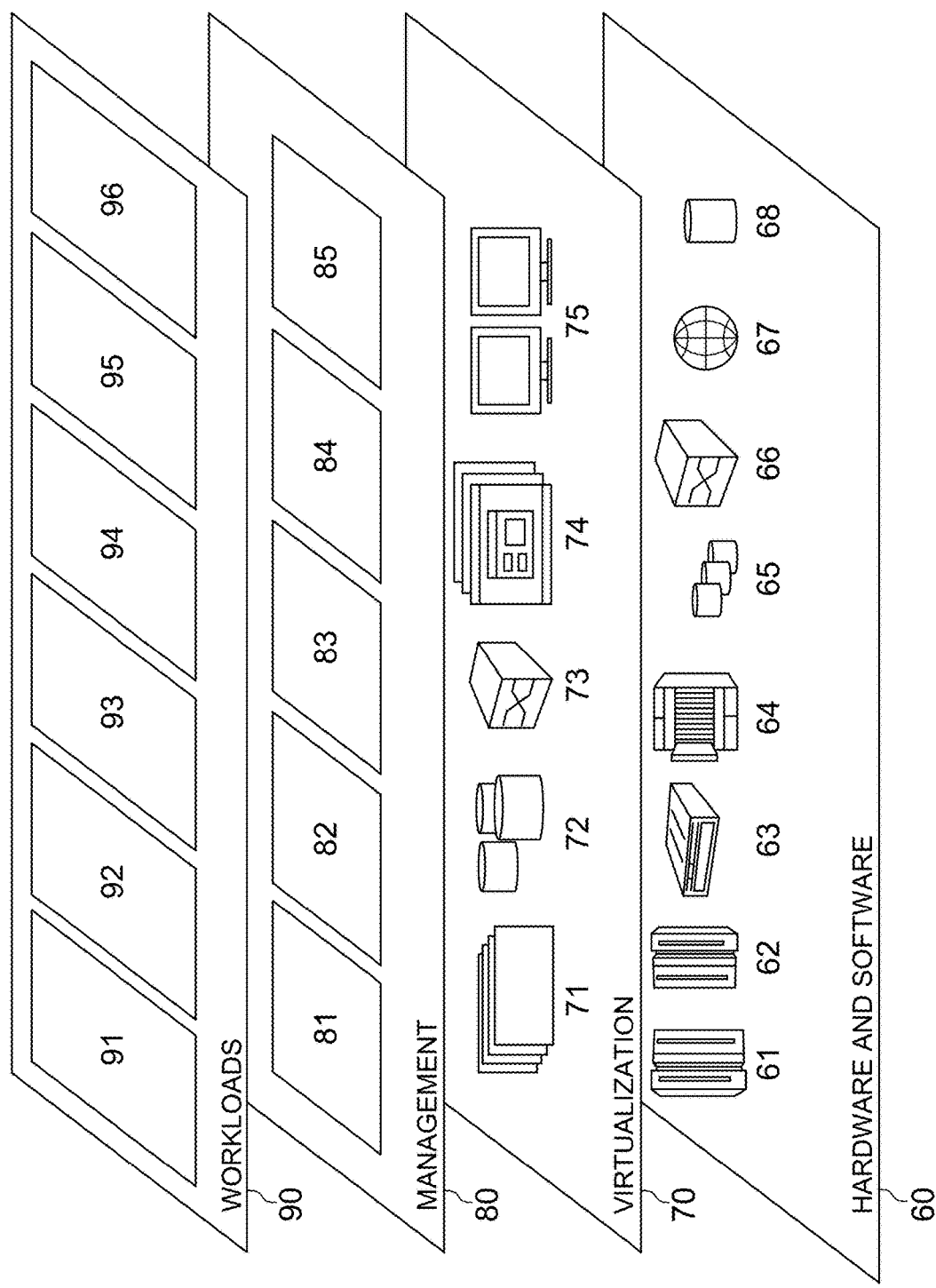
FIG. 6 depicts abstraction model layers, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed storage of authentication data 96. Distributed storage of authentication data 96 may relate to functionality that allows for the secure storage of an encrypted template of biometric data on a client device while user authentication is performed by a biometric server that stores only a key to decrypt the biometric data and a hashing value of the template for template validation.

What is claimed is:

1. A method for distributed storage and authentication of biometric data of a user, comprising:

receiving, by a biometric server, a transmission of a biometric sample an encrypted enrollment template, and a nonce of the user from a client device, wherein the encrypted enrollment template comprises an encrypted mathematical representation of historical biometric data of the user generated by the biometric server during an enrollment phase, wherein the biometric sample comprises a current snapshot of the biometric data, and wherein the nonce based on an arbitrary number used to determine communication authenticity;

decrypting, by the biometric server, the encrypted enrollment template to an enrollment template using an enrollment template key, wherein the enrollment key was generated and stored on the server during the enrollment phase;

converting, by the biometric server, the biometric sample to a biometric template wherein the biometric template is based on encrypting the biometric sample with the enrollment key; and based on determining, by the biometric server, that a current hash value and an enrollment template hash value associated with the user are identical and that the biometric template is similar to the enrollment template associated with the user, sending, by the biometric server, an access token to the client device, wherein determining the template is similar to the enrollment template associated with the user is based on determining that a template matching is within predetermined tolerance thresholds, wherein the current hash value determined from the received encrypted enrollment template, and wherein the enrollment template hash value is stored on the server and generated during the enrollment phase.

2. The method of claim 1, wherein the transmission is based on an asymmetrical encryption of the biometric data using a public key to encrypt the biometric data and a private key to decrypt the biometric data.

3. The method of claim 2, wherein receiving the transmission of the biometric sample and the encrypted enrollment template further comprises:
receiving a payload, wherein the payload is encrypted using the asymmetrical encryption and comprises a biometric sample, an encrypted enrollment template and the nonce;
decrypting the payload using the private key; and
determining the authenticity of the payload based on analyzing the nonce.

4. The method of claim 1, further comprising:
receiving, during the enrollment phase, a raw biometric sample associated with the user;
converting the raw biometric sample to the enrollment template;
generating the enrollment template key;
encrypting the enrollment template based on the enrollment template key;
sending the encrypted enrollment template to the client device; and
storing the enrollment template key on the biometric server.

5. The method of claim 4, further comprising:
determining the enrollment template hash value from the enrollment template prior to sending the encrypted enrollment template to the client device;
based on receiving the encrypted enrollment sample, determining a current hash value; and
determining that the current hash value and the enrollment template hash value associated with the user are identical.

6. The method of claim 1, wherein the encrypted enrollment template is stored on the client device and the enrollment template key is stored on the biometric server.

7. The method of claim 1, further comprising based on determining, by the biometric server, that the biometric template is not similar to the enrollment template associated with the user, sending notification to the client device.

8. A computer program product for distributed storage and authentication of biometric data of a user, the computer program product comprising:
one or more computer-readable storage devices and program instructions stored on at least one of the one or more tangible storage devices, the program instructions comprising:
program instructions to receive, by a biometric server, a transmission of a biometric sample an encrypted enrollment template, and a nonce of the user from a client device, wherein the encrypted enrollment template comprises an encrypted mathematical representation of historical biometric data of the user generated by the biometric server during an enrollment phase, wherein the biometric sample comprises a current snapshot of the biometric data, and wherein the nonce based on an arbitrary number used to determine communication authenticity;
program instructions to decrypt, by the biometric server, the encrypted enrollment template to an enrollment template using an enrollment template key, wherein the enrollment key was generated and stored on the server during the enrollment phase;
program instructions to convert, by the biometric server, the biometric sample to a biometric template, wherein the biometric template is based on encrypting the biometric sample with the enrollment key; and
based on program instructions to determine, by the biometric server, that a current hash value and an enrollment template hash value associated with the user are identical and that the biometric template is similar to the enrollment template associated with the user, sending, by the biometric server, an access token to the client device, wherein determining the template is similar to the enrollment template associated with the user is based on determining that a template matching is within predetermined tolerance thresholds, wherein the current hash value determined from the received encrypted enrollment template, and wherein the enrollment template hash value is stored on the server and generated during the enrollment phase.

9. The computer program product of claim 8, wherein the transmission is based on an asymmetrical encryption of the biometric data using a public key to encrypt the biometric data and a private key to decrypt the biometric data.

10. The computer program product of claim 9, wherein receiving the transmission of the biometric sample and the encrypted enrollment template further comprises:
program instructions to receive a payload, wherein the payload is encrypted using the asymmetrical encryption and comprises a biometric sample, an encrypted enrollment template and the nonce;
program instructions to decrypt the payload using the private key; and
program instructions to determine the authenticity of the payload based on analyzing the nonce.

11. The computer program product of claim 8, further comprising:
program instructions to receive, during the enrollment phase, a raw biometric sample associated with the user;
program instructions to convert the raw biometric sample to the enrollment template;
program instructions to generate the enrollment template key;
program instructions to encrypt the enrollment template based on the enrollment template key;
program instructions to send the encrypted enrollment template to the client device; and
program instructions to store the enrollment template key on the biometric server.

12. The computer program product of claim 11, further comprising:
program instructions to determine the enrollment template hash value from the enrollment template prior to sending the encrypted enrollment template to the client device;
based on program instructions to receive the encrypted enrollment sample, program instructions to determine a current hash value; and
program instructions to determine that the current hash value and the enrollment template hash value associated with the user are identical.

13. The computer program product of claim 8, wherein the encrypted enrollment template is stored on the client device and the enrollment template key is stored on the biometric server.

14. The computer program product of claim 8, further comprising based on program instructions to determine, by the biometric server, that the biometric template is not similar to the enrollment template associated with the user, program instructions to send notification to the client device.

15. A computer system for distributed storage and authentication of biometric data of a user, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive, by a biometric server, a transmission of a biometric sample an encrypted enrollment template, and a nonce of the user from a client device, wherein the encrypted enrollment template comprises an encrypted mathematical representation of historical biometric data of the user generated by the biometric server during an enrollment phase, wherein the biometric sample comprises a current snapshot of the biometric data, and wherein the nonce based on an arbitrary number used to determine communication authenticity;
program instructions to decrypt, by the biometric server, the encrypted enrollment template to an enrollment template using an enrollment template key, wherein the enrollment key was generated and stored on the server during the enrollment phase;
program instructions to convert, by the biometric server, the biometric sample to a biometric template, wherein the biometric template is based on encrypting the biometric sample with the enrollment key; and
based on program instructions to determine, by the biometric server, that a current hash value and an enrollment template hash value associated with the user are identical and that the biometric template is similar to the enrollment template associated with the user, sending, by the biometric server, an access token to the client device, wherein determining the template is similar to the enrollment template associated with the user is based on determining that a template matching is within predetermined tolerance thresholds, wherein the current hash value determined from the received encrypted enrollment template, and wherein the enrollment template hash value is stored on the server and generated during the enrollment phase.

16. The computer system of claim 15, wherein the transmission is based on an asymmetrical encryption of the biometric data using a public key to encrypt the biometric data and a private key to decrypt the biometric data.

17. The computer system of claim 16, wherein receiving the transmission of the biometric sample and the encrypted enrollment template further comprises:
program instructions to receive a payload, wherein the payload is encrypted using the asymmetrical encryption and comprises a biometric sample, an encrypted enrollment template and the nonce;
program instructions to decrypt the payload using the private key; and
program instructions to determine the authenticity of the payload based on analyzing the nonce.

18. The computer system of claim 15, further comprising:
program instructions to receive, during the enrollment phase, a raw biometric sample associated with the user;
program instructions to convert the raw biometric sample to the enrollment template;
program instructions to generate the enrollment template key;
program instructions to encrypt the enrollment template based on the enrollment template key;
program instructions to send the encrypted enrollment template to the client device; and
program instructions to store the enrollment template key on the biometric server.

19. The computer system of claim 18, further comprising:
program instructions to determine the enrollment template hash value from the enrollment template prior to sending the encrypted enrollment template to the client device;
based on program instructions to receive the encrypted enrollment sample, program instructions to determine a current hash value; and
program instructions to determine that the current hash value and the enrollment template hash value associated with the user are identical.

20. The computer system of claim 15, wherein the encrypted enrollment template is stored on the client device and the enrollment template key is stored on the biometric server.

* * * * *